United States Patent
Yadav et al.

(10) Patent No.: US 7,496,678 B2
(45) Date of Patent: Feb. 24, 2009

(54) METHOD AND SYSTEM FOR UNIFIED CACHING OF MEDIA CONTENT

(75) Inventors: Sandeep Yadav, Santa Clara, CA (US); Stephen Wu, Sacramento, CA (US); Anureita Rao, Bangalore (IN); Venkatesh Ks, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 567 days.

(21) Appl. No.: 11/228,689

(22) Filed: Sep. 16, 2005

(65) Prior Publication Data

US 2006/0259637 A1    Nov. 16, 2006

(30) Foreign Application Priority Data

May 11, 2005    (IN)    ........................... 551/CHE/2005

(51) Int. Cl.
*G06F 15/16* (2006.01)

(52) U.S. Cl. ...................................... 709/231; 709/236
(58) Field of Classification Search ................. 709/231, 709/236
See application file for complete search history.

(56) References Cited

U.S. PATENT DOCUMENTS

| | | | |
|---|---|---|---|
| 5,043,885 A | 8/1991 | Robinson | |
| 5,402,416 A | 3/1995 | Cieslak et al. | |
| 5,583,561 A | 12/1996 | Baker et al. | |
| 5,586,264 A | 12/1996 | Belknap et al. | |
| 5,615,362 A | 3/1997 | Jensen et al. | |
| 5,737,747 A | 4/1998 | Vishlitzky et al. | |
| 5,799,185 A | 8/1998 | Watanabe et al. | |
| 5,819,292 A | 10/1998 | Hitz et al. | |
| 5,854,887 A | 12/1998 | Kindell et al. | |
| 5,918,020 A | 6/1999 | Blackard et al. | |
| 5,960,452 A | 9/1999 | Chi | |
| 5,963,962 A | 10/1999 | Hitz et al. | |
| 6,038,230 A | 3/2000 | Ofek | |
| 6,038,570 A | 3/2000 | Hitz et al. | |
| 6,064,676 A | 5/2000 | Slattery et al. | |
| 6,085,193 A | 7/2000 | Malkin et al. | |
| 6,111,896 A | 8/2000 | Slattery et al. | |
| 6,275,496 B1 * | 8/2001 | Burns et al. | 370/429 |
| 6,324,182 B1 * | 11/2001 | Burns et al. | 370/429 |
| 6,343,083 B1 | 1/2002 | Mendelson et al. | |
| 6,351,471 B1 | 2/2002 | Robinett et al. | |
| 6,351,474 B1 | 2/2002 | Robinett et al. | |
| 6,366,970 B1 | 4/2002 | Wolff et al. | |
| 6,370,688 B1 | 4/2002 | Hejna, Jr. | |
| 6,377,972 B1 | 4/2002 | Guo et al. | |

(Continued)

OTHER PUBLICATIONS

NetCache TM 5.1 Accelerator First-Time Configuration Guide.

(Continued)

*Primary Examiner*—Jeffrey Pwu
*Assistant Examiner*—David Ampagoomian
(74) *Attorney, Agent, or Firm*—Perkins Coie LLP

(57) ABSTRACT

A method and system for unified caching of media content are described. The system includes a streaming media protocol engine to receive a request for a data stream in a first format from a client system; a streaming media mass storage subsystem to locate the data stream stored by a cache server in a second format; and a network protocol engine to serve the located data stream to the client system in the first format.

15 Claims, 6 Drawing Sheets

U.S. PATENT DOCUMENTS

| | | | |
|---|---|---|---|
| 6,407,680 B1 * | 6/2002 | Lai et al. | 341/50 |
| 6,463,508 B1 | 10/2002 | Wolf et al. | |
| 6,484,212 B1 | 11/2002 | Markowitz et al. | |
| 6,505,169 B1 | 1/2003 | Bhagavath et al. | |
| 6,516,361 B2 | 2/2003 | Lym et al. | |
| 6,522,649 B1 | 2/2003 | Stallkamp | |
| 6,593,860 B2 | 7/2003 | Lai et al. | |
| 6,594,699 B1 | 7/2003 | Sahai et al. | |
| 6,594,751 B1 | 7/2003 | Leivent | |
| 6,651,103 B1 | 11/2003 | Markowitz et al. | |
| 6,665,755 B2 | 12/2003 | Modelski et al. | |
| 6,708,213 B1 | 3/2004 | Bommaiah et al. | |
| 6,721,850 B2 | 4/2004 | Hofmann et al. | |
| 6,742,082 B1 | 5/2004 | Lango et al. | |
| 6,744,763 B1 | 6/2004 | Jones et al. | |
| 6,747,991 B1 | 6/2004 | Hemy et al. | |
| 6,760,765 B1 | 7/2004 | Asai et al. | |
| 6,829,648 B1 | 12/2004 | Jones et al. | |
| 6,917,984 B1 | 7/2005 | Tan et al. | |
| 6,990,512 B1 | 1/2006 | Major et al. | |
| 7,191,242 B1 * | 3/2007 | Serenyi et al. | 709/231 |
| 7,356,575 B1 * | 4/2008 | Shapiro | 709/220 |
| 2001/0003193 A1 | 6/2001 | Woodring et al. | |
| 2001/0034786 A1 | 10/2001 | Baumeister et al. | |
| 2001/0052132 A1 | 12/2001 | Fryer | |
| 2002/0029282 A1 | 3/2002 | Buddhikot et al. | |
| 2002/0042837 A1 | 4/2002 | Ebata et al. | |
| 2002/0047899 A1 | 4/2002 | Son et al. | |
| 2002/0056126 A1 | 5/2002 | Srikantan et al. | |
| 2002/0097750 A1 | 7/2002 | Gunaseelan et al. | |
| 2002/0116473 A1 | 8/2002 | Gemmell | |
| 2002/0116585 A1 | 8/2002 | Scherr | |
| 2002/0162047 A1 | 10/2002 | Peters et al. | |
| 2002/0169926 A1 | 11/2002 | Pinckney et al. | |
| 2002/0181506 A1 | 12/2002 | Loguinov | |
| 2003/0005452 A1 | 1/2003 | Rodriguez | |
| 2003/0067877 A1 | 4/2003 | Sivakumar et al. | |
| 2003/0189936 A1 | 10/2003 | Terrell et al. | |
| 2003/0217113 A1 | 11/2003 | Katz et al. | |
| 2003/0236904 A1 | 12/2003 | Walpole et al. | |
| 2004/0039837 A1 | 2/2004 | Gupta et al. | |
| 2004/0162787 A1 | 8/2004 | Madison et al. | |
| 2004/0163123 A1 * | 8/2004 | Okada et al. | 725/116 |
| 2004/0202148 A1 | 10/2004 | Kuehnel | |
| 2005/0117580 A1 | 6/2005 | del Val et al. | |
| 2005/0223107 A1 * | 10/2005 | Mine et al. | 709/231 |
| 2006/0047774 A1 | 3/2006 | Bowman et al. | |
| 2006/0064500 A1 | 3/2006 | Roth et al. | |
| 2006/0106961 A1 | 5/2006 | Ebata et al. | |
| 2006/0184667 A1 | 8/2006 | Clubb et al. | |
| 2006/0218611 A1 * | 9/2006 | Son et al. | 725/105 |
| 2007/0094407 A1 * | 4/2007 | Serenyi et al. | 709/231 |
| 2007/0143468 A1 * | 6/2007 | Serenyi et al. | 709/223 |
| 2008/0095339 A1 | 4/2008 | Elliott et al. | |

OTHER PUBLICATIONS

NetCache TM 5.1 Configuration Guide . . . .
NetCache TM 5.1 Deployment Planning Guide.
NetCache TM 5.1 Features and Configuration Planning Guide.
NetCache TM 5.1 Routine Administration Guide.
NetCache TM 5.1 Streaming Media Cache First-Time Configuration Guide.
NetCache TM 5.1 Web Cache First-Time Configuration Guide.
H. Schulzrinne, et al., "Real Time Streaming Protocol" (RTSP) Network Working Group, Copyright: The Internet Society 1998, pp. 1-86.

* cited by examiner

US 7,496,678 B2

METHOD AND SYSTEM FOR UNIFIED CACHING OF MEDIA CONTENT

RELATED APPLICATIONS

The present application is related to, incorporates by reference and hereby claims the priority benefit of the following India Patent Application, assigned to the assignee of the present application: India Patent Application No. 551/CHE/2005, filed May 11, 2005, entitled "Method and system for Unified Caching of Media Content."

FIELD

The present invention relates to streaming media and, more specifically, to a technique for unified caching of media content.

BACKGROUND

In multimedia broadcast over a computer network, such as the Internet, users may request and receive a data stream (e.g., a media stream) broadcast over the network. In this context, the media data stream is a digitized form of video, audio, and/or other multimedia that may be broadcast over the network and presented to a user. "Streaming" is a process by which a media file can begin playing on the client before it has been completely downloaded. The data is broken by the streaming process into many packets sized appropriately for the bandwidth available between the client and server. Each data packet generally comprises "payload" data appended to one or more network headers that define the packet's routing through the network. When the client has received enough packets, the user's media player software can be playing one packet, decompressing another and receiving a third. The user can begin listening to or viewing the requested content almost immediately, without having to download the entire media file.

In general, the broadcasting server communicates with one or more clients in the network according to a client/server model of information delivery. In this model, the client may comprise an application, such as a conventional web browser, executing on a computer that "connects" to the server over a computer network, such as a point-to-point link, shared local area network (LAN), wide area network (WAN), or virtual private network (VPN) implemented over a public network such as the Internet. Each client may request a data stream from the server by issuing messages, usually in the form of packets, to the server.

The server is a computer that provides a requested media data stream to one or more clients. The media data stream may be stored in a data storage medium, such as a magnetic disk, attached to the server. In this case, the server may be a file server ("filer") configured to provide file service relating to the information stored in its attached storage devices. Alternatively, rather than storing the data stream in a form of mass storage medium attached to the server, the data stream may reside in the server's memory or buffer cache. Thus, the server may be configured as a "network cache" that provides clients access to media data streams stored in its "in-core" memory, i.e., random-access memory (RAM), or media data streams stored on one or more mass storage devices (e.g., disks) associated with the network cache. For instance, the server may be a NetCache® device made by Network Appliance, Inc. of Sunnyvale, Calif., a proprietary application that manages file access requests for information stored in a computer's in-core memory.

A media player software installed on the client may be configured to accept streaming media in a particular format. The content provided to the user in response to a request for streaming data should be in the same format as indicated in the request. Some of the existing streaming media formats are Real Time Streaming Protocol (RTSP) and the Microsoft® Media Server (MMS). RTSP is a method of delivering streaming media content via the Internet in real-time. RTSP uses Real-Time Transport Protocol (RTP) to format packets of multimedia content.

Each media format is transmitted utilizing an associated streaming media protocol. The MMS protocol is used to transfer streaming data packets in the MMS format, while the RTSP protocol is used to transfer streaming data packets in the RTP format. The Windows Media Server HTTP streaming protocol (also called MMS over HTTP) is also used to transfer streaming data packets in the MMS format. Some versions of media players require streaming data in the MMS format, while other versions require streaming data in the RTP format.

When a media player opts for streaming data either via MMS or RTSP protocol, the data packets that the media player receives are encapsulated in a corresponding media format. A data packet received in the MMS format has an associated MMS header, while a data packet received in the RTP format has an associated RTP header. A data packet received in the MMS over HTTP format has an associated MMS header as well has an additional MMS over HTTP header.

A network cache may be used to provide streaming media to clients. In order to serve any media client that uses the RTSP or the MMS protocol, a network cache needs either to retrieve the content from its mass storage facility or to get the content from the origin server. If the requested content is stored on the network cache in a format that is different from the requested format, the network cache would have to fetch the requested content again from the origin server and store a copy of the content in the requested format. Consequently, twice the amount of disk space is used in order to cache the same content in different formats.

Caching two copies of the same data (payload) in order to accommodate streaming media requests over different streaming media protocols is inefficient, because it may cause twice the amount of disk space to be used in order to cache a particular content fetched via different control protocol, which, in turn, results in the network cache being able to cache only half of the number of potential unique streams. If fewer streams can be cached, the network cache may need to fetch more streams from the origin servers in order to accommodate client requests, which may result in diminished bandwidth savings.

Furthermore, when the disk space associated with the network cache approaches the limits of its capacity, the network cache needs to throw away (eject) data (e.g., the least recently used data) from its disk in order to cache the latest or fresh data. Thus, extra processing is required to handle the clients' requests, which may have a negative impact on the performance of the network cache.

SUMMARY

A method and system for unified caching of media content are described. According to one aspect, the system includes a streaming media protocol engine to receive a request for a data stream in a first format from a client system; a streaming media mass storage subsystem to locate the data stream stored by a cache server in a second format; and a network protocol engine to serve the located data stream to the client system in the first format.

Other features of the present invention will be apparent from the accompanying drawings and from the detailed description, which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In order to process requests for streaming data more efficiently and to optimize the disk space of a network cache and bandwidth utilization, in one embodiment of the present invention, a network cache converts the encapsulation of data packets (data packets' headers) received by one protocol into a unified format packet. A single copy of the cached content is stored by the network cache, and the content can be served to a requesting client off the cache regardless of the streaming media protocol associated with the request.

In one embodiment of the present invention, unified caching is accomplished by storing data on disk in a predetermined format (a unified format) and, if a client requests the cached data in a different format, converting the cached data into the requested format. For example, the MMS format may be designated as the unified format. During processing of a file access request from a client, if a client requests a cached file via a first protocol (e.g., RTSP), the on-disk headers associated with the requested data (e.g., in the MMS format) are converted into headers in the requested format (e.g., RTP headers), while the client is waiting for the request to be serviced, and the requested data is served to the client off the cache, thereby serving data with a header that complies with the requested protocol.

Figure 1:
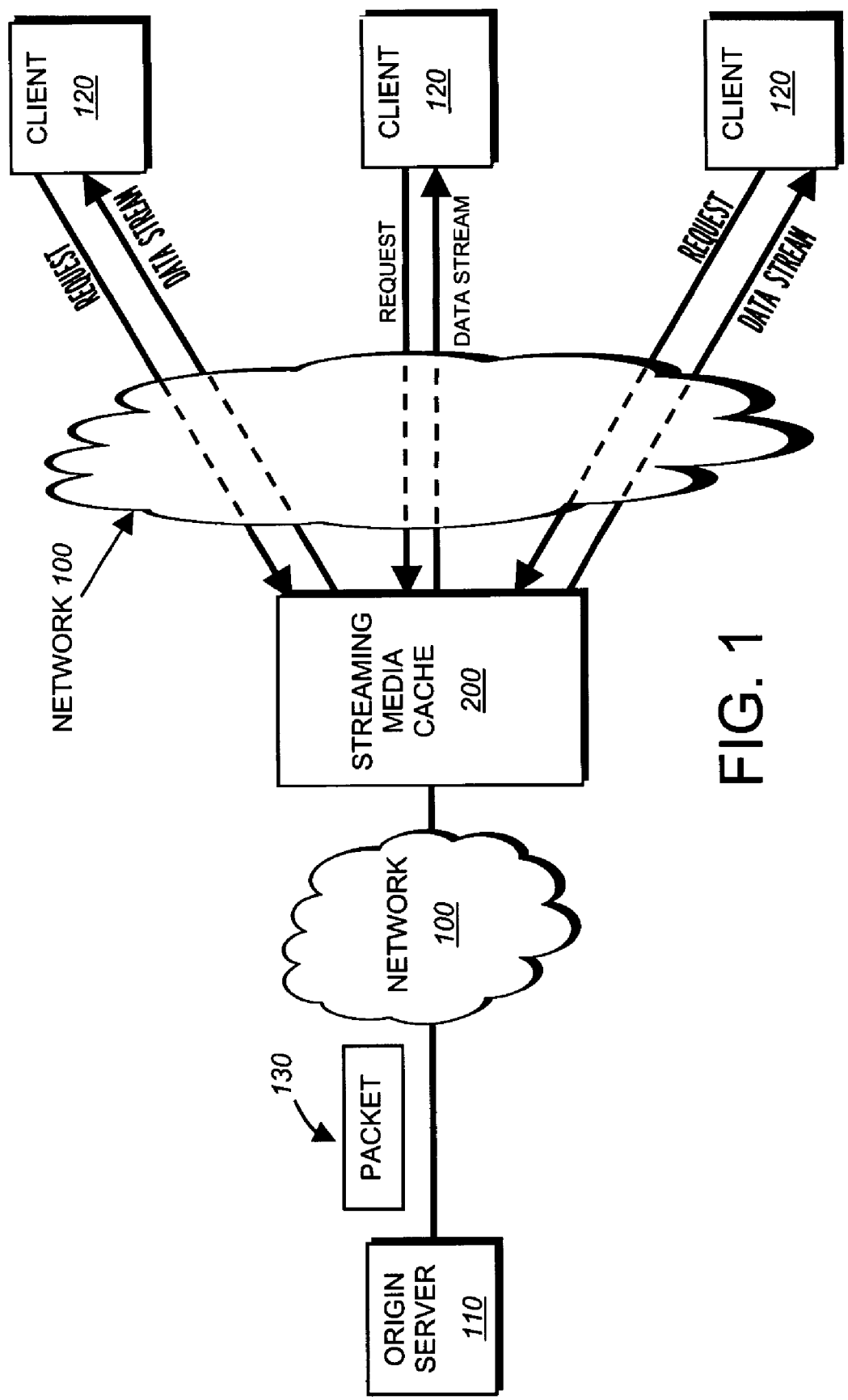
FIG. 1 is a schematic block diagram of a network where a streaming media cache receives a multimedia stream from a server and broadcasts the stream to one or more clients, according to one embodiment of the present invention.

FIG. 1 illustrates a streaming media cache (server) 200 coupled to an origin server 110 and a plurality of clients 120 over a network 100. The streaming media cache typically communicates with the origin server and the clients by exchanging discrete data packets 130 over the network. As used herein, a data packet is broadly understood to be a unit of data transmitted over the network. As such, a data packet according to the invention may comprise one or more conventional data packets. Typically, the packets are formatted in accordance with predetermined communication protocols, such as the Transmission Control Protocol (TCP), User Datagram Protocol (UDP) and the Internet Protocol (IP). In this context, a protocol consists of a set of rules defining how packets are communicated. Each data packet generally comprises "payload" data appended to one or more network headers that define the packet's routing through the network.

The network 100 includes a plurality of interconnected "nodes," e.g., computers, including the streaming media cache 200, the origin server 110, and the plurality of clients 120. The network may be organized to include wide area networks (WAN), shared local area networks (LAN), point-to-point links, virtual private networks (VPN) implemented over a public network such as the Internet, and so forth. Intermediate network devices (not shown), such as conventional routers and switches, in the network 100 typically provide network services that facilitate the transmission of data packets between nodes. For example, a Web Cache Coordination Protocol (WCCP) router in the network may be configured to forward data packets communicated between the clients 120 and the streaming media cache 200.

In operation, a client 120 sends a request for a data stream, or a portion of a data stream, over the network 100 to the streaming media cache 200. The requested data stream may comprise digitized representations of audio data, video data, static images, executable files, and the like, or any combination thereof. The client's request may take the form of a Uniform Resource Locator (URL), a Hypertext Transport Protocol (HTTP) message, etc.

If the streaming media cache 200 determines that it has a previously stored copy of the requested data stream, it returns a copy of the requested data stream to the client 120. The streaming media cache 200 may retrieve the client-requested data stream from its "permanent," e.g., non-volatile, storage media and/or from its "in-core" memory, such as random access memory (RAM). For instance, in a video-on-demand (VOD) configuration, the streaming media cache may retrieve a client-requested video data stream from one or more of its storage disks. Alternatively, a client-requested "live" video data stream, e.g., received from the origin server 110, may be retrieved from the streaming media cache's in-core memory. It will be noted, that the inventive technique of servicing RTSP requests utilizing data stored by the cache 200 in the MMS format described herein is applicable generally to VOD configuration.

If the client-requested data stream is not resident in the streaming media cache, the cache 200 may, in turn, send a request to the origin server to retrieve it. Here, the origin server 110 is a computer that provides the streaming media cache with copies of data streams that may be served to the plurality of clients 120. In this arrangement, the streaming media cache may serve as an "accelerator" for the origin server. That is, a larger number of clients can concurrently access an origin server's data stream through the streaming media cache than through the origin server itself. As such, the streaming media cache can prevent high volumes of network traffic from "overloading" the origin server's network resources, e.g., its available bandwidth and memory.

A client request for streaming media typically specifies a streaming media format, e.g., MMS or RTSP. The determination of whether the streaming media cache 200 has a previously stored copy of the requested data stream is done, in one embodiment, by a lookup for a media file header. Each media file header stored in the streaming media cache 200 has an associated lookup key. Generally, a lookup key is used to determine whether the requested data can be obtained directly from the streaming media cache 200 or needs to be retrieved from the origin server 110. In one embodiment of the present invention, the streaming media cache 200 determines the version of the client media player prior to processing the request for streaming data, and, if the version of an associated media player is identified as an impermissible version, a failure is reported to the requesting client 120. For example, an RTSP access request from a client is denied unless the request is associated with a Windows® Media player, version 9.0 or above.

In one embodiment of the present invention, the keying and the lookup for the media file headers is driven by the Uniform Resource Locator (URL) specified by the client. For example, a URL associated with the client request may be of the following format: mms:/servername/filename. The "mms" portion of the URL identifies the request as an MMS request. The streaming media cache 200 utilizes an MMS session file header lookup key (e.g., NetCache:mms//servername:1755/filename/header) to determine if it stores the requested MMS session file header. If a URL associated with the client request specifies the RTP format (e.g., rtsp://servername/filename) by the "rtsp" portion of the URL, the streaming media cache 200 utilizes an RTSP session file header lookup key (e.g., Cache: rtsp//servername:554/filename/header) to determine if it stores the requested RTSP session file header. If the RTSP session file header lookup returns a miss, then the streaming media cache 200 obtains the Session Description Protocol (SDP) from the origin server 110 and writes the necessary information to disk 270. Once the SDP information has been obtained and written to disk 270, the streaming media cache 200 utilizes MMS lookup keys to determine if it stores the requested RTSP stream object and data. If the requested RTSP stream object and data cannot be located at the streaming media cache 200, the requested data stream is obtained from the origin server 110 utilizing RTP.

In one embodiment of the present invention, the keying and the lookup for the data is MMS based. Specifically, although data that was previously cached utilizing RTSP may already be stored by the cache 200 in the RTP format, all newly cached data is stored by the streaming media cache 200 only in the MMS format. When a user requests a data stream in the RTP format and the requested data is already stored by the streaming media cache 200 in the MMS format, the requested data may be located by the cache 200 utilizing an MMS lookup key. The MMS lookup key is generated by converting the RTSP lookup key associated with the request into an MMS lookup key. The data, once located, is converted into the RTP format (e.g., by manipulating the packet headers) and served to the client in the RTP format.

In general, when a unified caching format is not used, the streaming media cache 200 stores content on disk with an MMS file header if the content has ever been streamed by a media player using an mms:// URL, and with an RTSP file header if the content has ever been streamed by a media player using an rtsp:// URL. An object having an associated MMS file header may be located with an MMS lookup key (e.g., NetCache:mms://server_name:1755/filename/header). An object having an associated RTSP file header may be located with an RTSP lookup key (e.g., NetCache:rtsp://server_name:554/filename/header).

Figure 2:
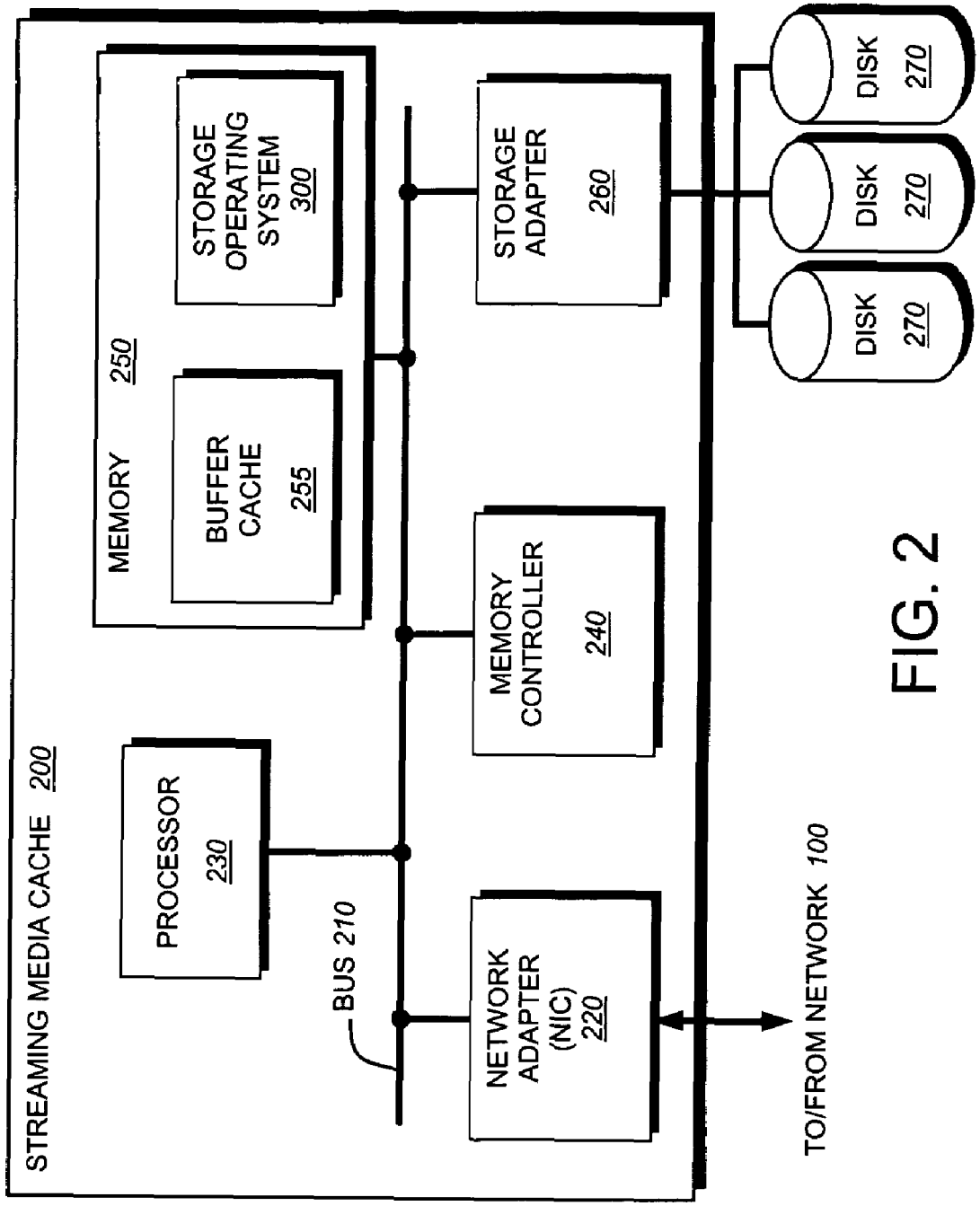
FIG. 2 is a schematic block diagram of a computer system that may embody the streaming media cache in FIG. 1, according to one embodiment of the present invention.

FIG. 2 is a computer system that may be used to embody the illustrative streaming media cache 200. The streaming media cache may be any type of special-purpose computer (e.g., server) or general-purpose computer, including a standalone computer. The streaming media cache 200 comprises a network adapter 220, a processor 230, a memory controller 240, a memory 250 and a storage adapter 260 interconnected by a system bus 210.

The memory 250 comprises storage locations that are addressable by the processor and adapters for storing software program code. The memory comprises a form of random access memory (RAM) that is generally cleared by a power cycle or other reboot operation (e.g., it is a "volatile" memory). Those skilled in the art will appreciate that other memory means, such as FLASH memory media, may also be used for storing the program instructions and data structures shown in the memory 250. The streaming media cache's processor 230 and adapters 220 and 260 can address data and instructions stored in the memory through the memory controller 240. More specifically, the controller enables addressed portions of the memory's contents to be communicated over the bus 210.

Portions of a storage operating system 300 are typically resident in the memory 250. The term "storage operating system" as used herein generally refers to computer-executable code operable on a computer system that implements file system semantics and manages data access. The storage operating system 300 may be implemented as a microkernel, as well as an application program operating over a general-purpose operating system (e.g., a general-purpose operating system with configurable functionality).

In addition, a portion of the memory 250 may be organized as a "buffer cache" 255 for storing memory buffer ("mbuf") data structures that are passed between layers of the storage operating system 300 during normal runtime operation. The streaming media cache's processor and adapters may, in turn, comprise processing elements and/or logic circuitry configured to manipulate these data structures. According to an illustrative embodiment, mbufs stored in the buffer cache 255 may contain one or more data streams that may be requested by the plurality of clients 120.

The network adapter 220 sends and receives data to/from other nodes in the network 100, e.g., over an Ethernet link, a synchronous optical network (SONET) link, a wireless connection, etc. Specifically, the network adapter comprises the mechanical, electrical and signaling circuitry needed to connect the streaming media cache 200 to a client 120 over the computer network 100. The adapter may also include specialized processing elements, such as logic or processors that format in-coming and out-going packets consistent with a predetermined network communication protocol. The network adapter may be implemented by components and circuitry on a network interface card (NIC), as known in the art.

The storage adapter 260 cooperates with the operating system 300 to access client-requested data streams stored on the disks 270. The storage disks (or other storage devices) are attached, via the storage adapter 260, to the streaming media cache 200. The storage adapter includes input/output (I/O) interface circuitry that couples to the disks over an I/O interconnect arrangement, such as a conventional high-performance, Fibre Channel serial link topology. The client-requested data streams are retrieved by the storage adapter and processed by the processor 230 (or the adapter 260 itself) in accordance with the storage operating system 300. The data streams are then forwarded over the system bus 210 to the network adapter 220, where they are formatted into packets and sent to their requesting clients 120.

Figure 3:
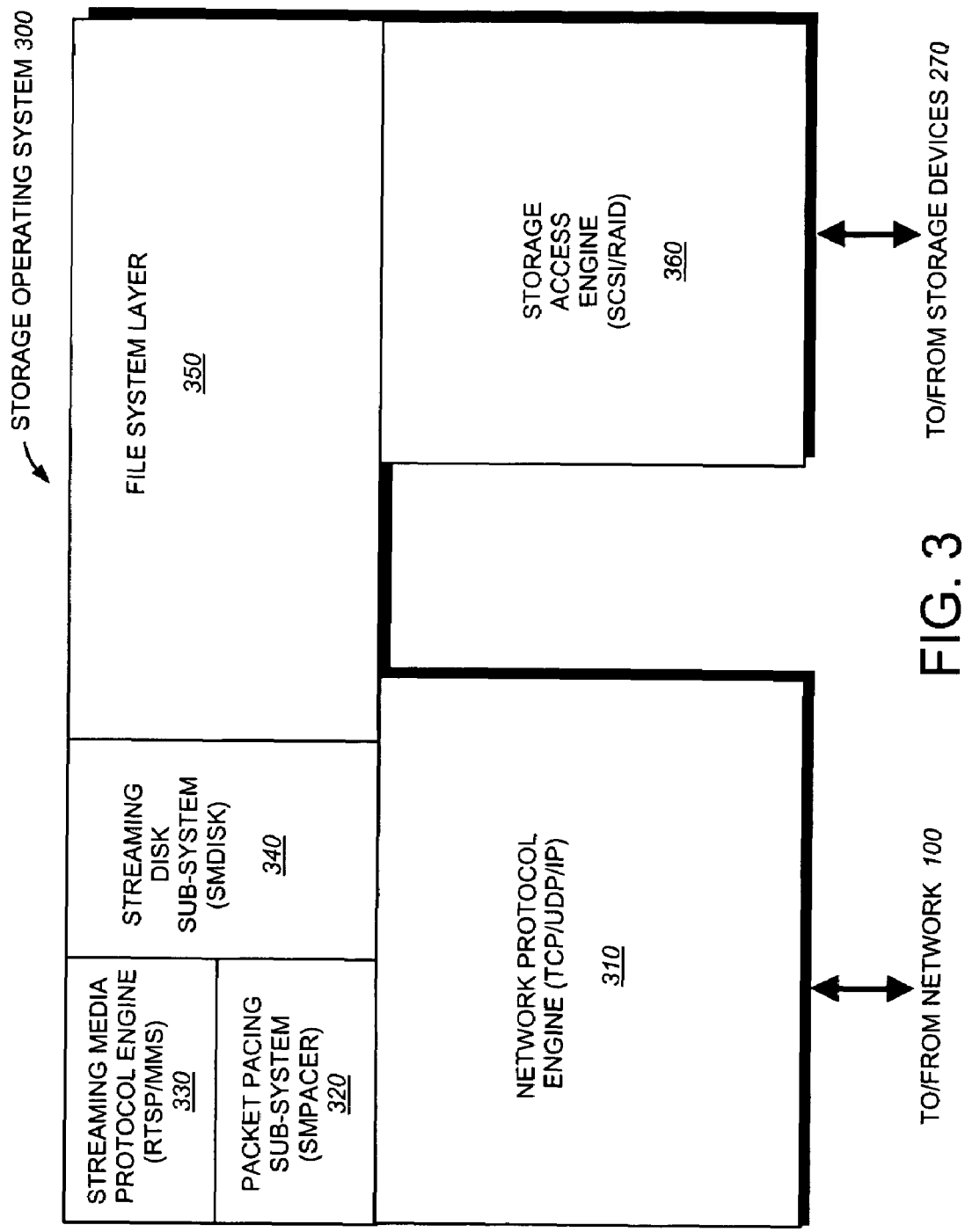
FIG. 3 is a schematic block diagram of a storage operating system for use with the streaming media cache in FIG. 1, according to one embodiment of the present invention.

FIG. 3 is a schematic block diagram illustrating the exemplary storage operating system 300, which may represent the streaming media cache 200. The operating system communicates with the network 100 through a series of software layers, which are organized as a network protocol engine 310. The layers of the network protocol engine 310 process network headers appended to data packets transmitted and received to/from the network. For example, the engine 310 may comprise a data link layer, an IP layer, a TCP/UDP layer, and so forth.

According to the illustrative embodiment, the network protocol engine 310 associates a unique "port" number with each streaming media protocol, such as the RTSP or the MMS protocol, that may be processed by the streaming media cache 200. The engine 310 identifies a received data packet as being formatted according to a particular streaming media protocol when a port number stored in a designated header of the received packet equals the port number associated with the protocol. For example, if the RTSP and MMS protocols are respectively associated with TCP port numbers 554 and 1755, then the 310 identifies data packets addressed to TCP port number 554 as RTSP data packets, whereas packets addressed to TCP port number 1755 are identified as MMS data packets. Those skilled in the art will appreciate that the port number identifying the streaming media protocol need not be associated with a TCP port and may be, e.g., a UDP port number instead. Furthermore, as mentioned above, the RTSP and MMS requests may be identified by a respective "mms" or "rtsp" portion of the request URL.

When the network protocol engine 310 identifies that a received data packet is addressed to a port number associated with a streaming media protocol, the packet is passed from the engine 310 to the protocol's corresponding streaming media protocol engine 330. For example, a packet addressed to TCP port 554 may be passed from the network protocol engine 310 to an RTSP protocol engine. Each streaming media protocol engine 330 is configured to process data packets formatted in accordance with its corresponding streaming media protocol. For instance, the RTSP protocol engine processes data packets containing RTSP requests for a data stream (e.g., requests to PLAY, PAUSE, or RECORD the stream).

The streaming media protocol engines 330 are interfaced with a packet pacing sub-system (SMPACER) 320 and a streaming media disk sub-system (SMDISK) 340. The SMDISK sub-system, which may also be referred to as a streaming media persistent storage sub-system, receives instructions from the streaming media protocol engines to write and retrieve data packets to/from the storage devices 270. To that end, SMDISK sub-system 340 issues functional calls to a file system layer 350, which writes or retrieves data to/from the storage devices through a storage access engine 360. The storage access engine 360 comprises a series of software layers that facilitate data transfers between the file system and the storage devices. For instance, these layers may include, e.g., a disk storage layer to manage a redundant array of independent disks (RAID), a disk driver layer to manage communications over a small computer system interface (SCSI), and so forth.

The SMDISK sub-system is preferably configured to process data packets that are stored in one or more memory buffers (mbufs), e.g., located in the buffer cache 255. Accordingly, the SMDISK sub-system 340 may pass mbuf pointers referencing the data packets to other layers in the storage operating system 300. For example, the SMDISK sub-system may forward mbuf pointers referencing data packets retrieved from the storage devices 270 to the SMPACER sub-system. Similarly, the SMDISK sub-system may receive mbuf pointers corresponding to data packets received by the network protocol engine 310.

The SMPACER sub-system 320 is responsible for determining the rate at which data packets are sent from the streaming media cache 200 to their requesting clients 120. In one embodiment, the SMPACER sub-system 320 waits to receive a predetermined number of mbuf pointers referencing packets of a client-requested data stream. Once the predetermined number of mbuf pointers has been received (or, optionally, once a predetermined period of time has elapsed), the SMPACER sub-system 320 makes a "call-back" (i.e., a function call) to an appropriate streaming media protocol engine 330, which returns a "delivery time" that defines when a copy of the data packet should be transmitted to its requesting client. The choice of which streaming media protocol engine 330 is called by the SMPACER sub-system depends on which streaming media protocol, e.g., RTSP or MMS protocol, is used by the requesting client. For instance, SMPACER 330 makes a call-back to an MMS protocol engine when the requesting client is configured to communicate via the MMS protocol.

Figure 4:
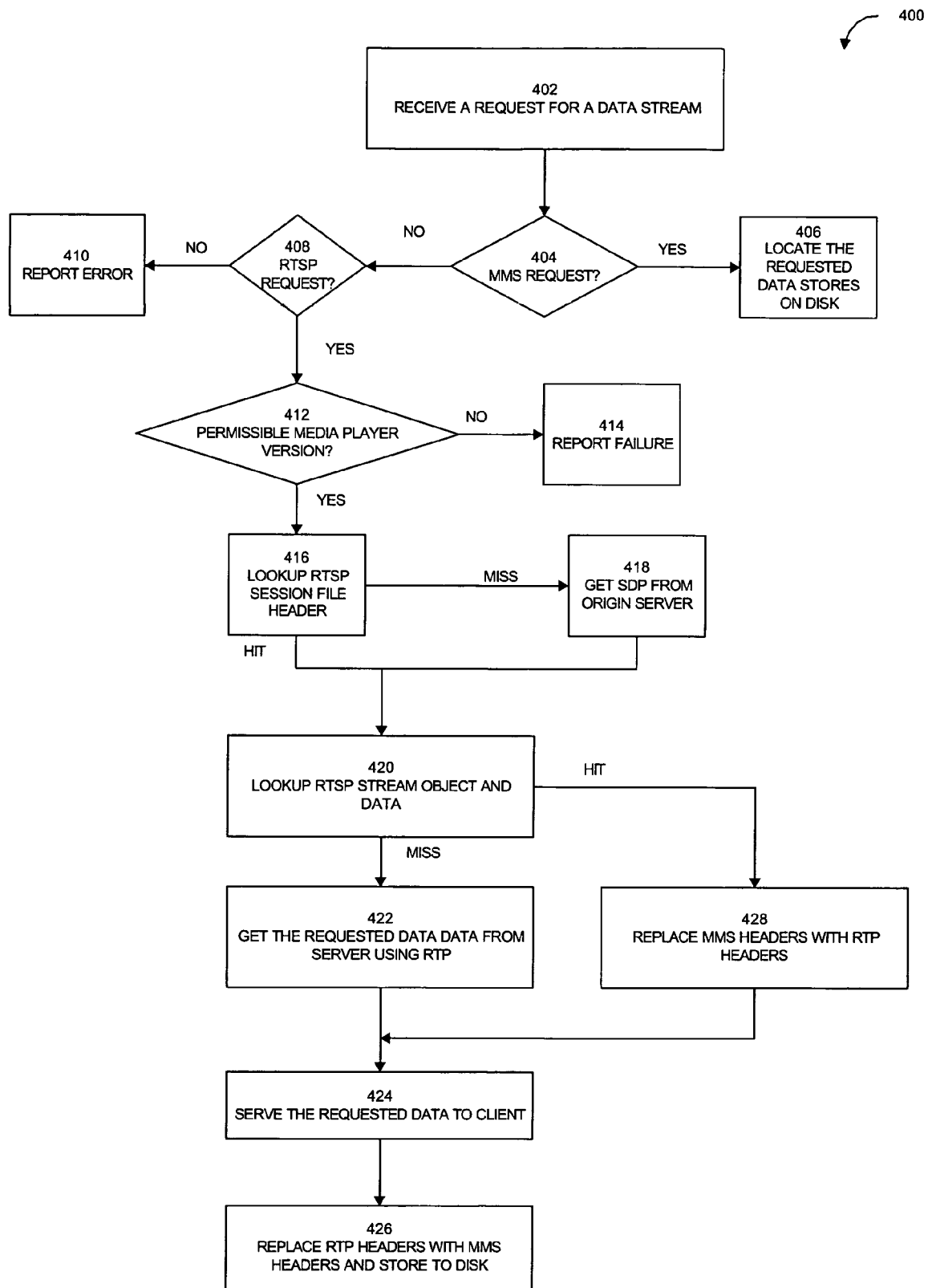
FIG. 4 is a flowchart illustrating a method for unified caching of media content, according to one embodiment of the present invention.

FIG. 4 illustrates a method 400 for unified caching of media content, according to one embodiment of the present invention. The method 400 commences at operation 402, where the cache 200 receives a request for streaming data from the client system 120. If it is determined, at operation 404, that the request is for data in the MMS format (i.e, the client access is MMS), the method 400 proceeds to operation 406. At operation 406, the cache 200 determines if it has a previously stored copy of the requested data stream, retrieves the requested data from the origin server 110 if necessary, and returns a copy of the requested data stream to the client 120. If it is determined, at operation 408, that the client access is RTSP, the version of a media player associated with the request is identified. In some embodiments, an RTSP request is only permissible where the request is associated with a streaming data request originated with a media player running certain versions of a media player software. If the software version of the associated media player is identified as an impermissible version at operation 412, a failure is reported to the requesting client at operation 414.

Once it is determined that the request is the RTSP request and that it originated from an allowable software version of a media player, a lookup for the RTSP file session header is performed at operation 416. The lookup is performed utilizing an RTSP lookup key (e.g., NetCache:rtsp://server_name:554/filename/header). If the RTSP session file header lookup returns a miss, then the streaming media cache 200 obtains SDP from the origin server, writes the necessary information to disk 270 at operation 418, and performs a lookup for the RTSP stream object and data at operation 420. The lookup is performed utilizing MMS lookup keys (e.g., NetCache:mms://server_name:1755/filename-validator/storage and NetCache:mms:mms/server_name:1755/filename-validator/object-num). If the RTSP session file header lookup returns a hit, then the method proceeds directly to operation 420.

If the lookup for the RTSP stream object and data at operation 420 returns a miss (e.g., a miss for the entire stream or for a specific object on disk), the requested data is retrieved from the origin server 110 utilizing RTP at operation 422. The requested data is then served to the requesting client at operation 424.

In order to optimize disk utilization, media content is stored by the cache 200 in a unified format, which, in one embodiment, is the MMS format. At operation 426, the requested data is manipulated to convert its format into a unified format, (e.g., the associated RTP headers are stripped and replaced with MMS headers), after which the data is stored on disc in the unified format.

If the lookup for the RTSP stream object and data at operation 420 returns a HIT (i.e., the requested data is being stored on cache 200 in the MMS format) on disk), the MMS headers of the requested data are replaced with the RTP headers at operation 428. The method then proceeds to operation 424.

It will be noted, that although the method 400 is described with reference to the MMS and RTSP protocols, the method may be utilized to achieve unified caching of media content and the ability to utilize one copy of the payload stored in the cache 200 to process client requests regardless of the associated access protocol.

Figure 5A:
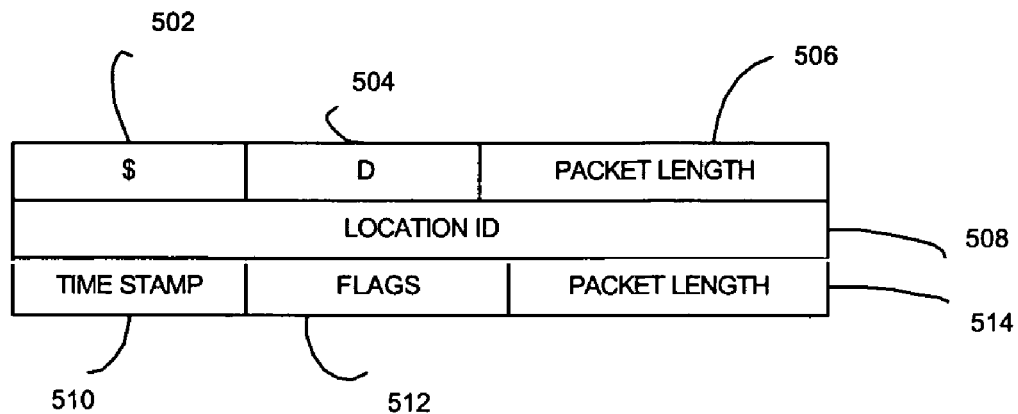
FIG. 5A illustrates an MMS/MMS-HTTP data header, according to one embodiment of the present invention.

An illustrative MMS/MMS-HTTP data header stored by the cache 200 on disk is illustrated in FIG. 5A. The header comprises hard coded data fields 502 and 504 that together indicate the beginning of the data packet, packet length field 506 (derived from RTP payload format header length), location ID field 508, timestamp field 510 indicating real play time of the packet, flags field 512 indicating the type of an associated Advanced Systems Format (ASF) object, and packet length field 514 (derived from RTP payload format header and including MMS header).

Figure 5B:
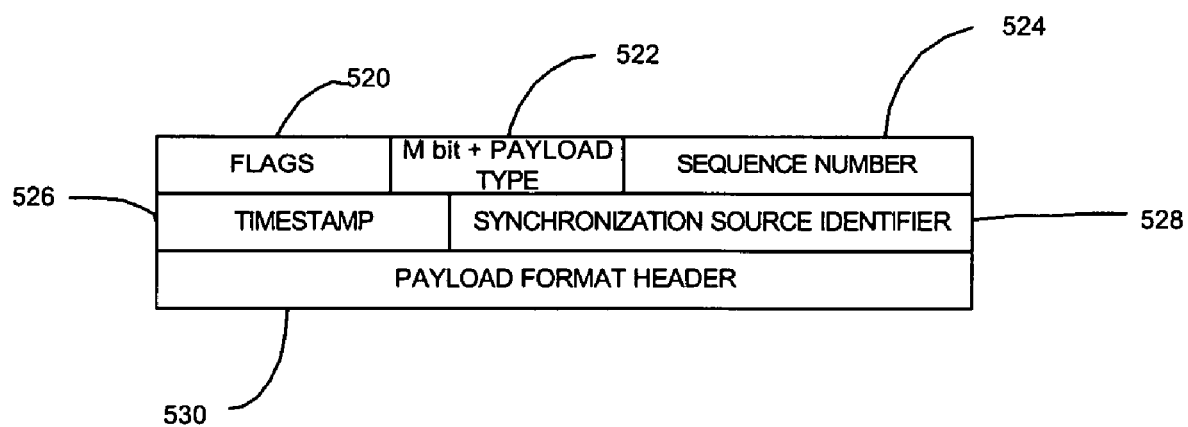
FIG. 5B illustrates an RTP data header, according to one embodiment of the present invention.

An illustrative RTP data header that stored by the cache 200 on disk is illustrated in FIG. 5B. Flags 520 include version (identifying the version of RTP), padding (indicating whether the packet contains one or more additional padding octets at the end which are not part of the payload), extension bit (if the extension bit is set, the fixed header is followed by exactly one header extension), and other information. Field 522 stores M bit (a marker to allow significant events such as frame boundaries to be marked in the packet stream) and the payload type that identifies the format of the RTP payload and determines its interpretation by the application.

A sequence number in field 524 is initially assigned a random value and is incremented by 1 for each ASF data packet. Field 526 stores RTP timestamp that can be set from Send Time field of the AFS data header (or payload parsing information). Field 528 stores synchronization source (SSRC) identifier, which may be set to a random value. Fields 520-528 may be collectively referred to as the RTP header. Field 530 is a payload format header.

Figure 6:
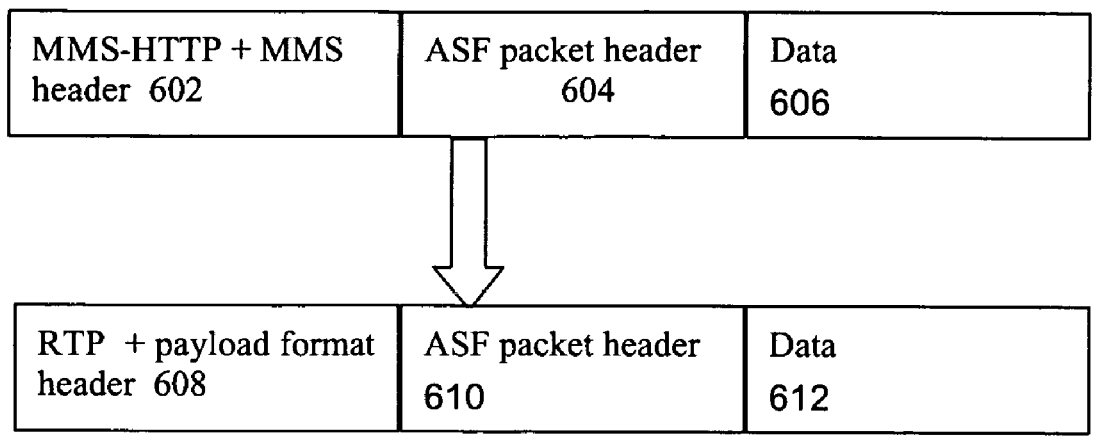
FIG. 6 illustrates replacing the MMS-HTTP header with the RTP header, according to one embodiment of the present invention.

As illustrated in FIG. 6, when data is being served via the RTSP protocol, the MMS-HTTP header 602 is stripped from each packet and replaced with the RTP header 608 before sending data packets to the client.

Figure 7:
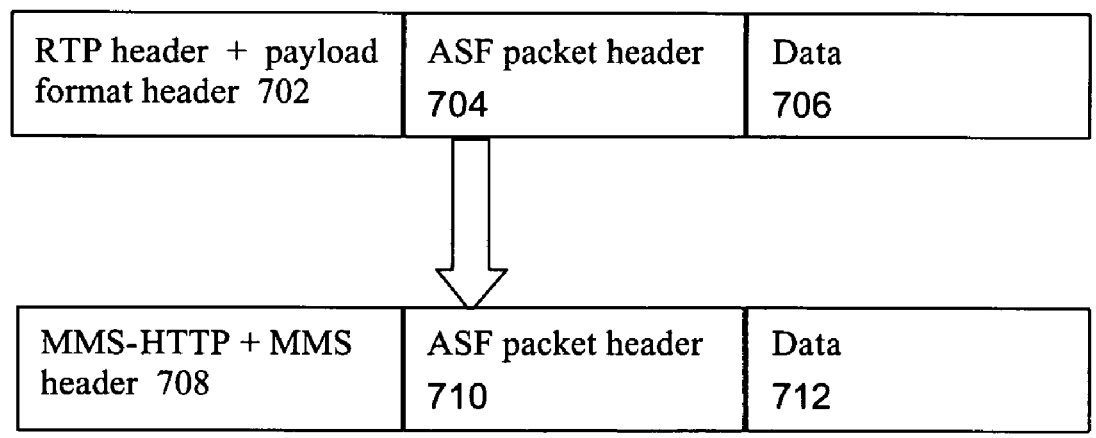
FIG. 7 illustrates replacing the RTP header with the MMS-HTTP header, according to one embodiment of the present invention.

In one illustrative embodiment of the present invention, the data packets are written to disk with MMS headers after the data is served to the client. As shown in FIG. 7, the fields of the MMS header 708 are derived from the RTP header 702 before the packet is written to disk.

Deriving the MMS LocationId 508 (also called packet id) from the RTP header 702 may be described as follows. While the sequence number 524 in an RTP header increments by 1 for every RTP packet, the MMS packet id 508 in a Master Boot Record (MBR) file may not follow the same pattern. The data from the various streams is multiplexed, or interleaved, so that samples with similar presentation times across all streams are close to one another in the data section of the ASF file. There is no information in the ASF file header, the RTP header, or the ASF data packet header that can be used to identify the actual MMS packet id in the ASF file. This packet id depends on the layout of all the streams in the file. When data is being streamed via RTSP, it is assumed that packet ids are incremented by 1. It is acceptable for packet ids to be non-incrementing across the objects stored on disk. It is also acceptable for packet ids to be duplicated in different objects.

In one illustrative embodiment, cache 200 uses packet id to prefetch data from the origin server 110 (in the case of MMS-HTTP, ASF offset may be used, which is calculated using the packet id). The prefetching is performed by packet ids. Because exact packet locations are not known to the cache 200, the packet ids are estimated and generated by the cache 200. Thus, the cache 200 may be requesting packet 120, when the actual packet id in the file on the origin server 110 is 142. The origin server 110 would then send packets 120 through 141 before sending the required packet 142, which may result in a buffering-timeout problem for clients. In order to alleviate this situation, multiple MBR files associated with the requesting media player with large numbers of streams may be examined in order to determine an upper boundary of a discrepancy between a generated packet id and an actual packet id that can be tolerated. Alternatively, the pre-fetching logic may be modified to increase the prefetching window (e.g., to 20 seconds, as opposed to 10 seconds), which enables the cache 200 to handle extra data received from the origin server 110.

The foregoing has been a detailed description of an illustrative embodiment of the invention. Various modifications and additions can be made without departing from the spirit and scope of the invention. For example, random time offsets assigned to requesting clients are used to derive "delivery times" in the illustrative embodiment. However, it is expressly contemplated that the invention's teachings and principles relating to choosing a predetermined timing interval based on a client's requested bit rate apply even when the client's derived delivery times do not incorporate random time offsets. In addition, the RTSP and MMS protocols are described herein as exemplary streaming media protocols, although the present invention, in one embodiment, equally applies to other streaming media protocols. Also, a streaming media protocol engine 330 may be configured to check whether a client has security privileges, e.g., according to an access control list (ACL), before the client is permitted to access its requested data stream.

While the illustrative streaming media cache 200 may be a general-purpose computer, it may also be a specialized computer, such as a gaming console, that supplies data streams to one or more clients coupled over a network. Further, it is expressly contemplated that the teachings of this invention can be implemented as software, including a computer-readable medium having program instructions executing on a computer, hardware, firmware, or a combination thereof. Moreover, those skilled in the art will also understand that the teachings set forth herein are not limited to any specific operating system (OS) implementation, and instead may be executed by a wide variety of OS platforms. Accordingly this description is meant to be taken only by way of example and not to otherwise limit the scope of the invention.

The invention claimed is:

1. A storage server comprising:
   a streaming media protocol engine to receive a request for a streaming media data stream from a client system;
   a streaming media mass storage subsystem to
   determine whether the request is for the data stream in a first streaming media protocol; and
   in response to determining that the request is not for the data stream in the first streaming media protocol but is for the data stream in a second streaming media protocol, then to
   look up in the storage server a session file header for the data stream, the session file header corresponding to the second streaming media protocol, by using a first lookup key corresponding to the second streaming media protocol,
   retrieve, from a cache in the storage server, data corresponding to the data stream stored in a first format corresponding to the first streaming media protocol, by using a second lookup key corresponding to the first streaming media protocol, and replace headers of the data retrieved from the cache, said headers associated with the first streaming media protocol, with headers associated with the second streaming media protocol, to convert the data stream to a second format corresponding to the second streaming media protocol; and a network protocol engine to serve the located data stream to the client system in the second format.

2. The storage server of claim 1, wherein the streaming media mass storage subsystem is further to:
generate the first and second lookup keys by utilizing information associated with the request.

3. The storage server of claim 1, wherein the streaming media mass storage subsystem is to:
remove the headers associated with the second streaming media protocol from the data stream; and
associate the headers associated with the first streaming media protocol with the data stream;
store the data stream with the associated headers associated with the first streaming media protocol on a mass storage device associated with the cache server.

4. The storage server of claim 1, wherein the second format is RTSP format.

5. The storage server of claim 1, wherein the first format is MMS format.

6. The storage server of claim 1, wherein the network protocol engine is to:
responsive to the receiving of the request for a data stream from the client system, identify a version of a media player application associated with the request; and
if the version of the media player application associated with the request is an impermissible version, report a failure to the client system.

7. A method implemented in a cache server to provide streaming media data to a client system, the method comprising:
receiving a request for a streaming media data stream from the client system;
determining whether the request is for the data stream in a first streaming media protocol;
if the request is for the data stream in the first streaming media protocol, then
locating the data stream stored by the cache server in a first format corresponding to the first protocol, and
serving the located data stream to the client system in the first format;
if the request is not for the data stream in the first streaming media protocol and is for the data stream in a second streaming media protocol, then
looking up in the cache server a session file header for the data stream, the session file header corresponding to the second streaming media protocol, by using a first lookup key corresponding to the second streaming media protocol,
retrieving, from a cache in the cache server, data corresponding to the data stream stored in the first format, by using a second lookup key corresponding to the first streaming media protocol,
replacing headers of the data retrieved from the cache, said headers associated with the first streaming media protocol, with headers associated with the second streaming media protocol, to convert the data stream to a second format corresponding to the second streaming media protocol, and
serving the data stream to the client system in the second format.

8. The method of claim 7, further comprising:
generating the first and second lookup keys by utilizing information associated with the request.

9. The method of claim 7, further comprising:
removing the headers associated with the second streaming media protocol from the data stream; and
associating the headers associated with the first streaming media protocol with the data stream;
storing the data stream with the associated headers associated with the first streaming media protocol on a mass storage device associated with the cache server.

10. The method of claim 7, wherein the second format is RTSP format.

11. The method of claim 7, wherein the first format is MMS format.

12. The method of claim 7, further comprising:
responsive to the receiving of the request for a data stream from the client system, identifying a version of a media player application associated with the request; and
if the version of the media player application associated with the request is an impermissible version, reporting a failure to the client system.

13. The method of claim 7, wherein the first streaming media protocol is one of MMS and RTSP, and the second streaming media protocol is the other of MMS and RTSP.

14. A machine-readable medium having stored thereon data representing sets of instructions which, when executed by a machine, cause the machine to:
receive a request for a streaming media data stream from a client system;
determine whether the request is for the data stream in a first streaming media protocol;
in response to determining that the request is for the data stream in the first streaming media protocol, then
locate the data stream stored by a cache server in a first format corresponding to the first protocol; and
serve the located data stream to the client system in the first; and otherwise,
when the request is for the data stream in a second streaming media protocol, then
looking up in the cache server a session file header for the data stream, the session file header corresponding to the second streaming media protocol, by using a first lookup key corresponding to the second streaming media protocol,
retrieving, from a cache in the cache server, data corresponding to the data stream stored in the first format, by using a second lookup key corresponding to the first streaming media protocol,
replacing headers of the data retrieved from the cache, said headers associated with the first streaming media protocol, with headers associated with the second streaming media protocol, to convert the data stream to a second format corresponding to the second streaming media protocol, and
serving the data stream to the client system in the second format.

15. The storage server of claim 1, wherein the first streaming media protocol is one of MMS and RTSP, and the second streaming media protocol is the other of MMS and RTSP.

* * * * *